United States Patent
Wu

(10) Patent No.: US 10,487,915 B2
(45) Date of Patent: Nov. 26, 2019

(54) BICYCLE CHAIN

(71) Applicant: Jui-Chang Wu, Tainan (TW)

(72) Inventor: Jui-Chang Wu, Tainan (TW)

( * ) Notice: Subject to any disclaimer, the term of this patent is extended or adjusted under 35 U.S.C. 154(b) by 283 days.

(21) Appl. No.: 15/427,848

(22) Filed: Feb. 8, 2017

(65) Prior Publication Data
US 2018/0223955 A1    Aug. 9, 2018

(51) Int. Cl.
*F16G 13/06*   (2006.01)
*F16G 13/07*   (2006.01)
*F16G 13/00*   (2006.01)
*F16G 13/02*   (2006.01)
*B62M 9/12*    (2006.01)
*B62M 9/00*    (2006.01)
*B62M 9/06*    (2006.01)

(52) U.S. Cl.
CPC .............. *F16G 13/06* (2013.01); *B62M 9/12* (2013.01); *F16G 13/00* (2013.01); *F16G 13/02* (2013.01); *F16G 13/07* (2013.01); *B62M 9/06* (2013.01); *B62M 2009/005* (2013.01)

(58) Field of Classification Search
CPC .......... F16G 13/06; F16G 13/07; F16G 13/08; F16G 13/00; F16G 13/02; B62M 2009/005; B62M 9/12; B62M 9/06; B62M 9/1242; B62M 9/105; B62M 9/10
USPC ........................................................ 474/230
See application file for complete search history.

(56) References Cited

U.S. PATENT DOCUMENTS

| | | | | |
|---|---|---|---|---|
| 1,109,808 | A * | 9/1914 | Wilmot | F16G 13/02 474/227 |
| 1,453,088 | A * | 4/1923 | Bachman | F16G 13/02 474/227 |
| 1,694,275 | A * | 12/1928 | Merwin | F16G 13/07 474/219 |
| 4,102,216 | A * | 7/1978 | Nagano | F16G 13/02 474/231 |
| 5,362,282 | A * | 11/1994 | Lickton | F16G 13/06 474/220 |
| 7,325,391 | B1 * | 2/2008 | Oishi | F16G 13/06 59/5 |
| 7,437,870 | B2 * | 10/2008 | Wu | F16G 13/06 474/206 |
| 7,946,941 | B2 * | 5/2011 | Oishi | F16G 13/06 474/206 |
| 8,157,683 | B2 * | 4/2012 | Korse | F16H 7/06 474/156 |
| 9,255,624 | B2 * | 2/2016 | Fukumori | F16G 13/06 |
| 9,939,045 | B2 * | 4/2018 | Fukumori | F16G 13/06 |
| 2008/0119312 | A1 | 5/2008 | Oishi et al. | |
| 2011/0263369 | A1 * | 10/2011 | Kurihara | F16G 13/02 474/206 |

(Continued)

*Primary Examiner* — Michael R Mansen
*Assistant Examiner* — Raveen J Dias
(74) *Attorney, Agent, or Firm* — Wang Law Firm, Inc.

(57) ABSTRACT

A bicycle chain includes a plurality of link units in series connection, and each of the link units includes two outer link plates, two inner link plates, and a pin. Each outer link plate includes two outer plate end portions and an outer plate connecting portion between to the outer plate end portions, and each outer plate end portion has a bore. Each outer plate end portion of the outer link plate has two cut portions on an edge thereof. The cut portions of the outer link plates provides a space, which is helpful to derailing the chain onto another sprocket in a low interference and a fast and smooth way.

6 Claims, 11 Drawing Sheets

(56) References Cited

U.S. PATENT DOCUMENTS

2015/0094181 A1* 4/2015 Fukumori ................ B62M 9/00
　　　　　　　　　　　　　　　　　　　　474/206
2015/0308542 A1* 10/2015 Fukumori ................ B62M 9/00
　　　　　　　　　　　　　　　　　　　　474/230
2019/0048974 A1* 2/2019 Fukumori ............... F16G 13/06

* cited by examiner

BICYCLE CHAIN

BACKGROUND OF THE INVENTION

1. Technical Field

The present invention relates to a bicycle, and more particularly to a bicycle chain.

2. Description of Related Art

Bicycle is a human-powered vehicle, having a frame, two wheels, and a drivetrain system. The drivetrain system includes a chain, a front crankset, a rear cogset, a front derailleur, and a rear derailleur. The derailleurs are operated to derail the chain onto different sprockets.

Typically, a conventional bicycle chain includes a plurality of inner links and outer links, which are connected by pins. In a transverse movement of the chain when derailing, the outer links tend to contact with the sprocket. To enhance a smooth transverse movement of the chain and reduce interference when derailing, the crankset is provided with recess or dents, or the chain has specific design.

U.S. Patents No. 2008/0119312 and U.S. Pat. No. 7,325,391 disclosed a bicycle chain, which provides dents on the outer links and inclined portions on opposite ends of the outer links. The dents reduce thicknesses of the outer links, and the inclined portions provide spaces for derailing the chain onto the other sprocket.

However, making dents on the outer links will complicate the manufacture process, and the inclined portion will reduce the strength of the outer link. Therefore, the prior art didn't provide a good solution.

BRIEF SUMMARY OF THE INVENTION

In view of the above, the primary objective of the present invention is to provide a bicycle chain, which provides a smooth movement of the chain when derailing.

The secondary objective of the present invention is to provide a bicycle chain, which provides a low torque loss and high torque output.

In order to achieve the objective of the present invention, a bicycle chain includes a plurality of link units in series connection, and each of the link units includes two outer link plates, two inner link plates, and a pin. Each outer link plate includes two outer plate end portions and an outer plate connecting portion between to the outer plate end portions, and each outer plate end portion has a bore. Each outer link plate is defined with a bore line, which extends through centers of the bores, and two radial lines, which extend through the centers of the bores respectively and are perpendicular to the bore line. Each outer plate end portion of the outer link plate has two cut portions on an edge thereof, and each cut portion has two inclined sections on opposite sides of the edge of the outer plate end portion. Opposite ends of the inclined sections are located at opposite sides of the radial lines. The inner link plates each has two inner plate end portions, and each inner plate end portion has a bore. The inner link plates are attached to inner sides of the outer link plates with the bores of the inner link plates aligned with the bores of the outer link plates respectively. The pin is inserted into the bores of the outer link plates and the inner link plates.

The cut portions of the outer link plates provides a space, which is helpful to derailing the chain onto another sprocket in a low interference and a fast and smooth way.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
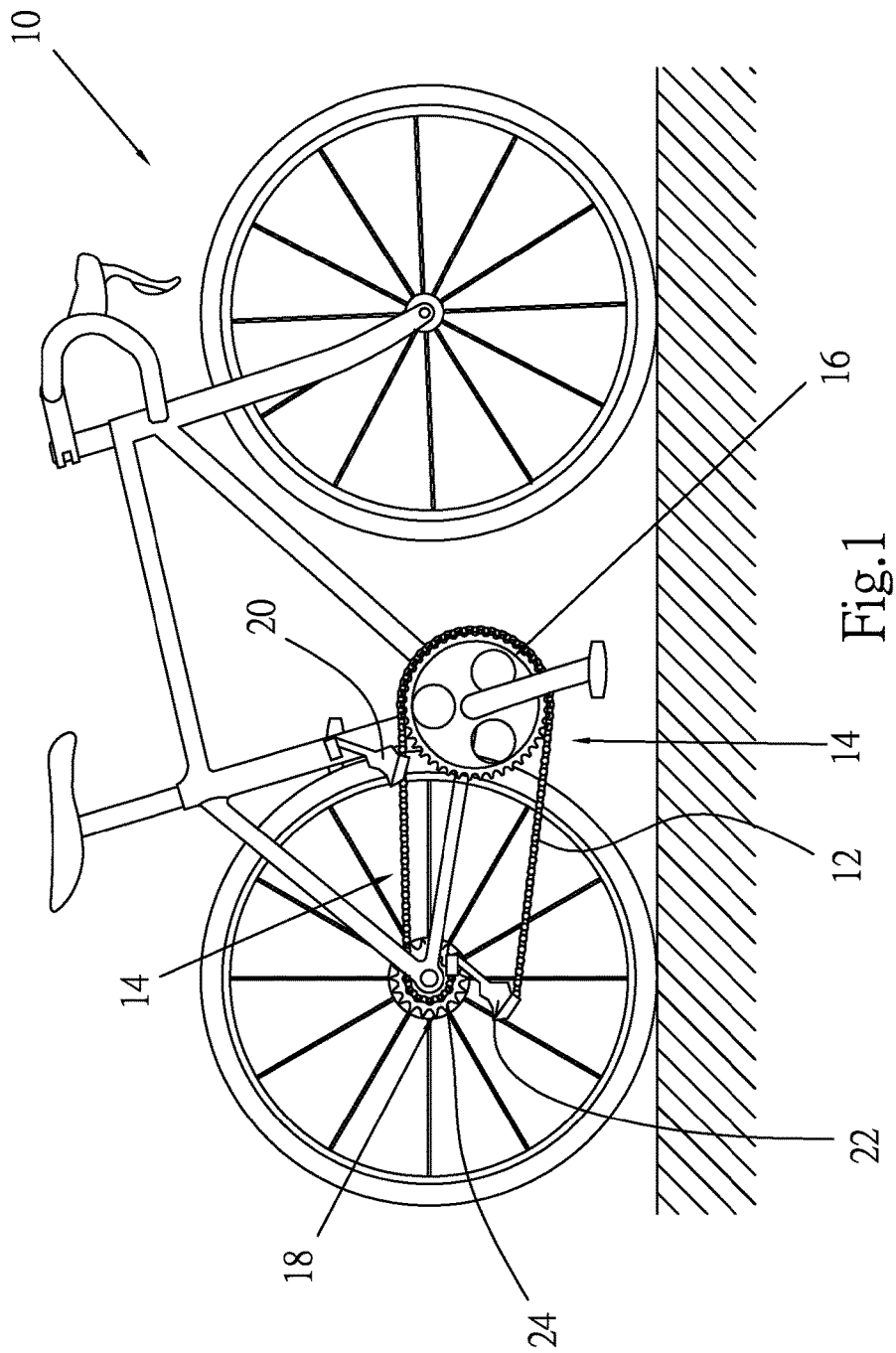
FIG. 1 is a perspective view of the bicycle of a preferred embodiment of the present invention.

FIG. 1 shows a bicycle 10, which has a drivetrain system 14. The drivetrain system 14 includes a chain 12, a front crankset 16, a rear cogset 18, a front derailleur 20, and a rear derailleur 22. The derailleurs 20, 22 are operated to derail the chain 12 onto different sprockets of the front crankset 16 and the rear cogset 18.

The present invention provides a new design of the chain 12 to reduce the interference between the chain 12 and the sprockets of the front crankset 16 and rear cogset 18 when derailing the chain 12 through the derailleurs 20, 22.

Figure 2:
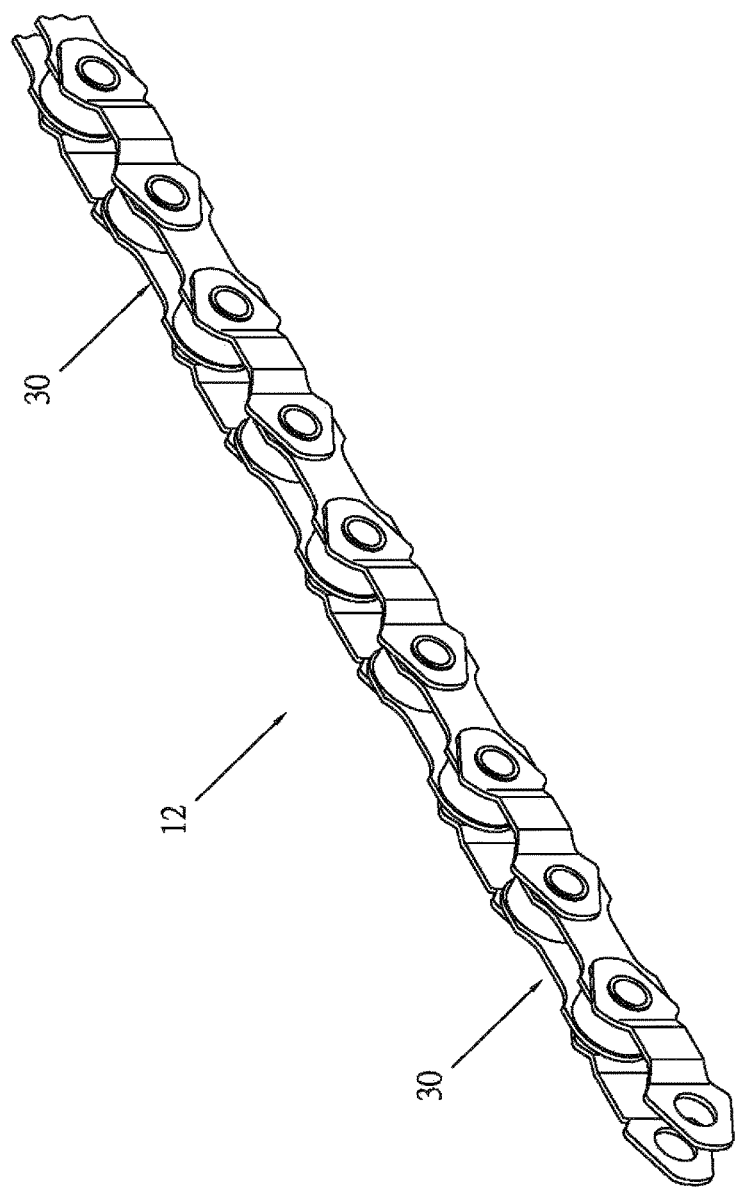
FIG. 2 is a perspective view of the chain of the preferred embodiment of the present invention.
Figure 3:
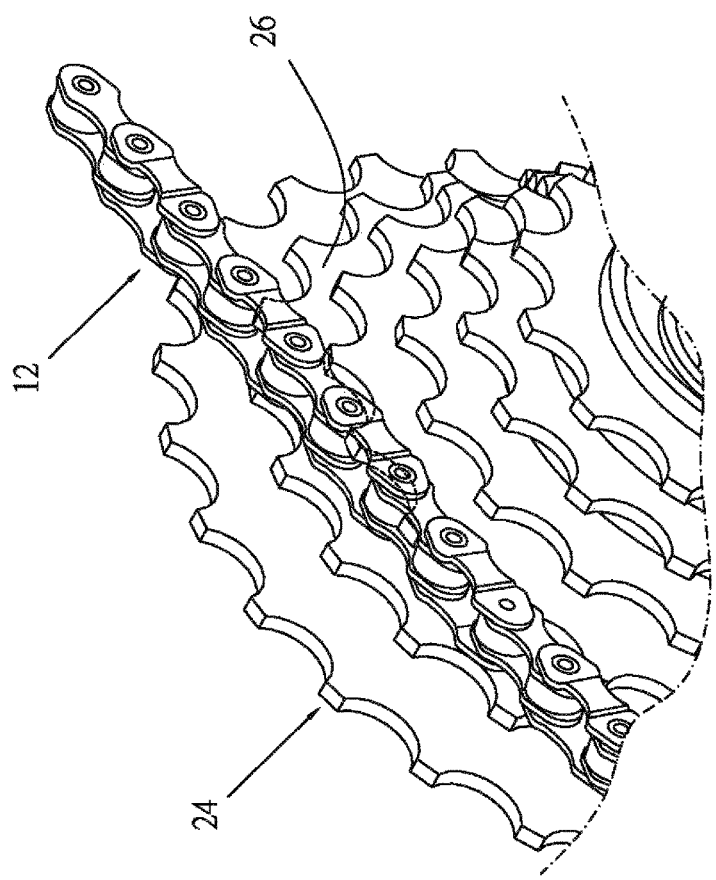
FIG. 3 is a perspective view of chain and the sprockets of the preferred embodiment of the present invention.

As shown in FIG. 2, the chain 12 of the preferred embodiment of the present invention includes a plurality of link units 30 connected together to form the endless chain 12. As shown in FIG. 3, some of the link units 30 engage one of the sprockets 24 of the rear cogset 18, while some of them engage one of the sprockets of the front crankset 16.

Figure 4:
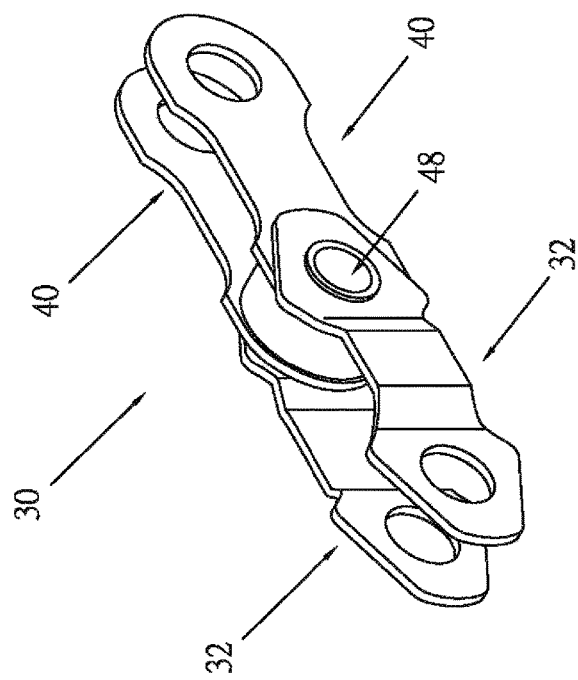
FIG. 4 is a perspective view of the link unit of the preferred embodiment of the present invention.

As shown in FIG. 4, each of the link units 30 includes two outer link plates 32, two inner link plates 40, and a pin 48. The outer link plates 32 are parallel, and kept a distance from each other. The inner link plates 40 are parallel, and have portions attached to inner sides of the outer link plates 32 while opposite ends of the pin 48 are connected to the overlapped portions of the outer link plates 32 and the inner link plates 40.

Figure 5:
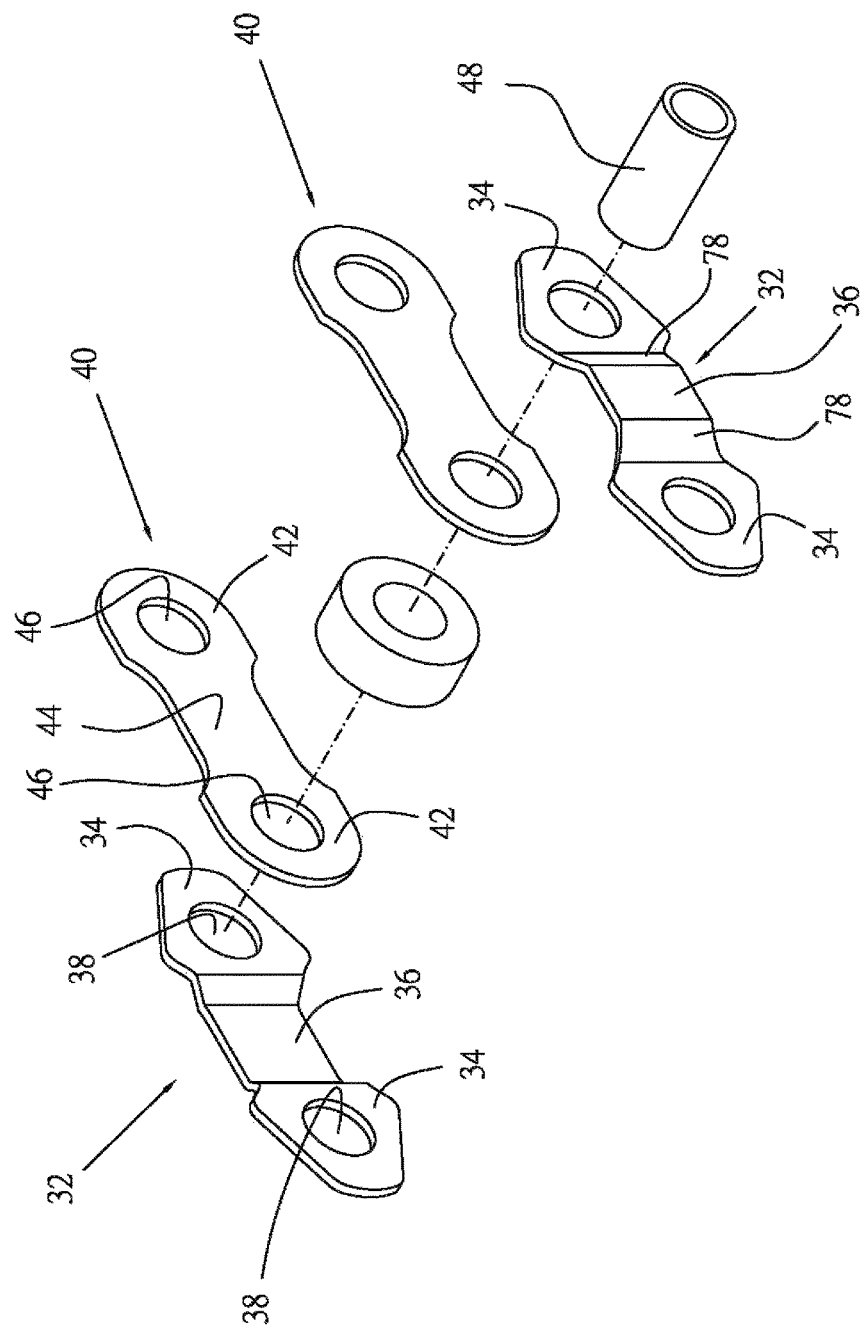
FIG. 5 is an exploded view of the link unit of the preferred embodiment of the present invention.

As shown in FIG. 5, the outer link plate 32 has two outer plate end portions 34 and an outer plate connecting portion 36 with opposite ends connected to the outer plate end portions 34. Each of the outer plate end portions 34 has a bore 38. The inner link plate 40 has two inner plate end portions 42 and an inner plate connecting portion 44 with opposite ends connected to the inner plate end portions 42.

Each of the inner plate end portions 42 has a bore 46. When the outer link plates 32 and the inner link plates 40 are assembled, the outer plate end portions 34 and the inner plate end portions 42 are overlapped, and the bores 38, 46 thereon are aligned with each other for the pin 48 passing therethrough.

Figure 6:
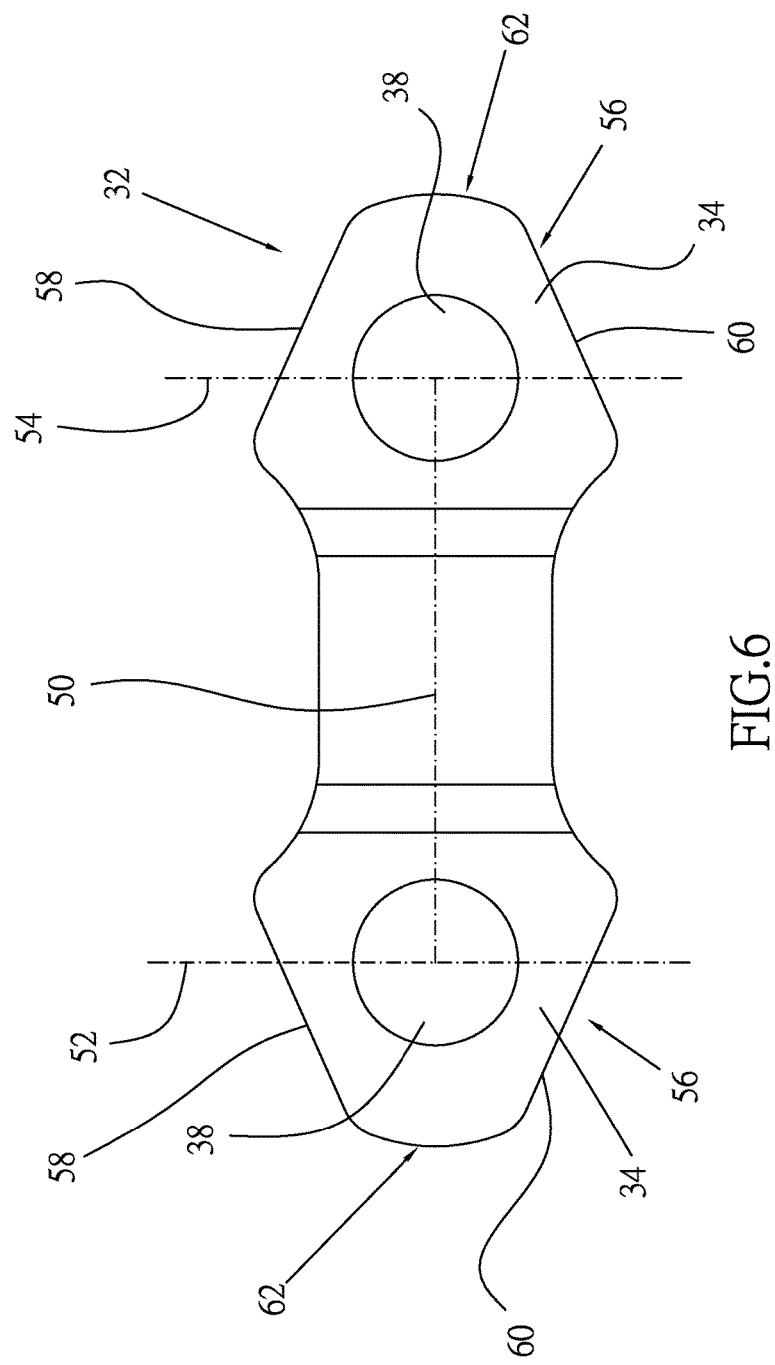
FIG. 6 is a front view of the outer link plate of the preferred embodiment of the present invention.

As shown in FIG. 6, the outer link plate 32 is defined with a bore line 50, which extends through centers of the bores 38, and two radial lines 52, 54, which extend through the centers of the bores 38 respectively and are perpendicular to the bore line 50.

The outer link plate 32 has two cut portions 56 on edges of the outer plate end portions 34 respectively, and each of the cut portions 56 includes two inclined sections 58, 60 on opposite sides of the edge of the outer plate end portion 34. The inclined sections 58, 60 make the bore 38 closer to the edge of the outer plate end portion 34. Furthermore, opposite ends of the inclined sections 58, 60 are located at opposite sides of the radial lines 52, 54 respectively.

The outer link plate 32 further has a curved section 62 on each of the edges of the outer plate end portions 34 respectively. Opposite ends of the curved section 62 are connected to the cut portions 56. Preferable, the curved section 62 is between the inclined sections 58, 60, and connected thereto.

Figure 7:
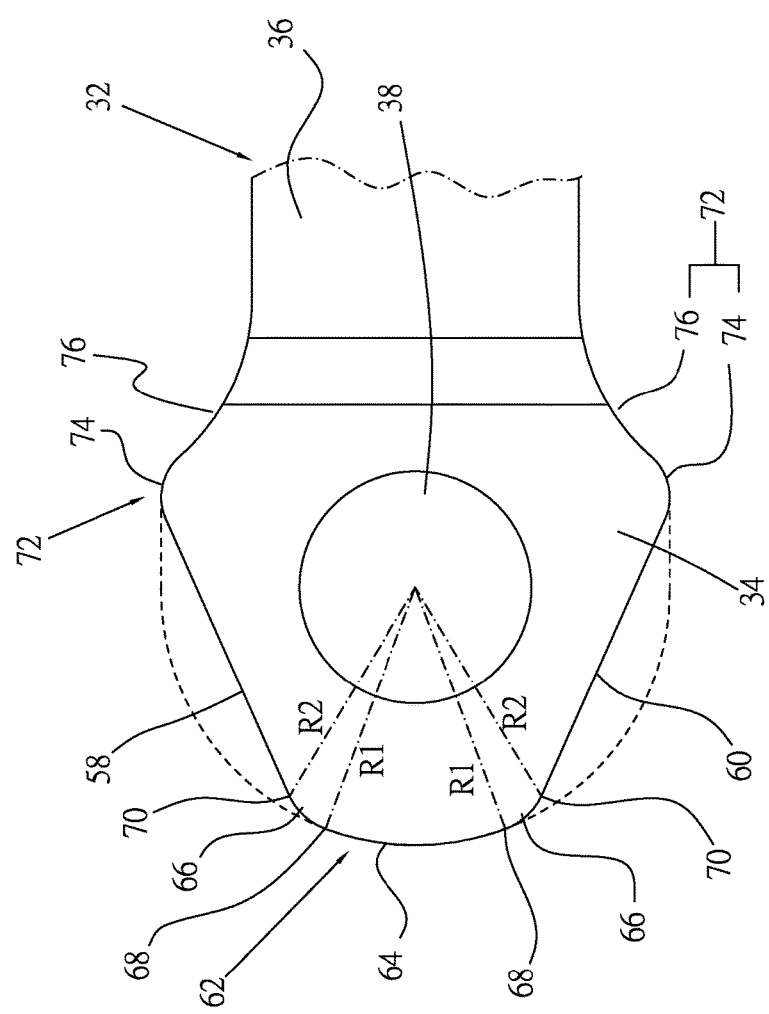
FIG. 7 is an enlarged view of the outer link plate of the preferred embodiment of the present invention.

As shown in FIG. 7, the curved section 62 has a front portion 64 and two connecting portions 66. Each of the connecting portions 66 has opposite ends connected to the front portion 64 and the inclined sections 58, 60 respectively. Two first connecting points 68 are defined between the connecting portions 66 and the front portion 64 respectively, and two second connecting points 70 are defined between the connecting portions 66 and the inclined sections 58, 60 respectively. A first diameter R1 is defined between the center of the bore 38 and the first connecting points 68, and a second diameter R2 is defined between the center of the bore 38 and the second connecting points 70. The first diameter R1 is greater than the second diameter R2, which means that the ends of the connecting portions 66 (the second connecting points 70) are closed to the center of the bore 38 than the ends of the front portion 64 (the first connecting points 68). It provides the inclined sections 58, 60 has a great slope. Please referring to the dot lines in FIG. 7, the inclined sections 58, 60 provide a space for derailing, and a change of curvatures of the connecting portions 66 reduces a stress on the second connecting points 70.

The outer link plate 32 further includes two extending curved sections 72 on each of the edges of the outer plate end portions 34 respectively. Each of the extending curved sections 72 has opposite ends connected to the end of the inclined sections 58, 60 and the outer plate connecting portion 36. Each of the extending curved sections 72 has an outward portion 74 and an inward portion 76. The outward portion 74 has opposite ends connected to the inclined section 58, 60 and the inward portion 76 while the inward portion 76 is connected to the outer plate connecting portion 36. The opposite curvature design of the extending curved sections 72 reduces the stresses of the inclined sections 58, 60, the outer plate connecting portion 36, as well as the portions nearby.

Figure 8:
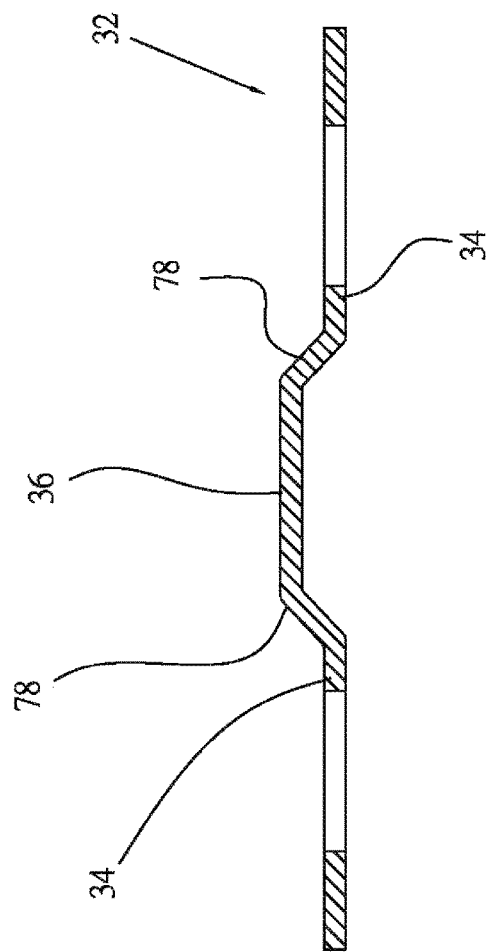
FIG. 8 is a top view of the outer link plate of the preferred embodiment of the present invention.
Figure 9:
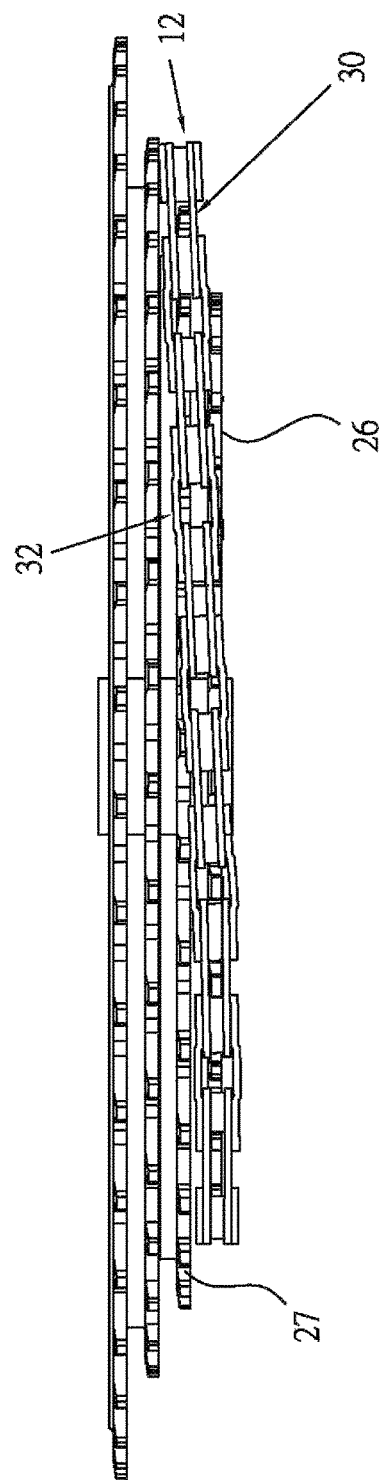
FIG. 9 is a sketch diagram of the link unit of the preferred embodiment of the present invention, showing derailing the chain.
Figure 10:
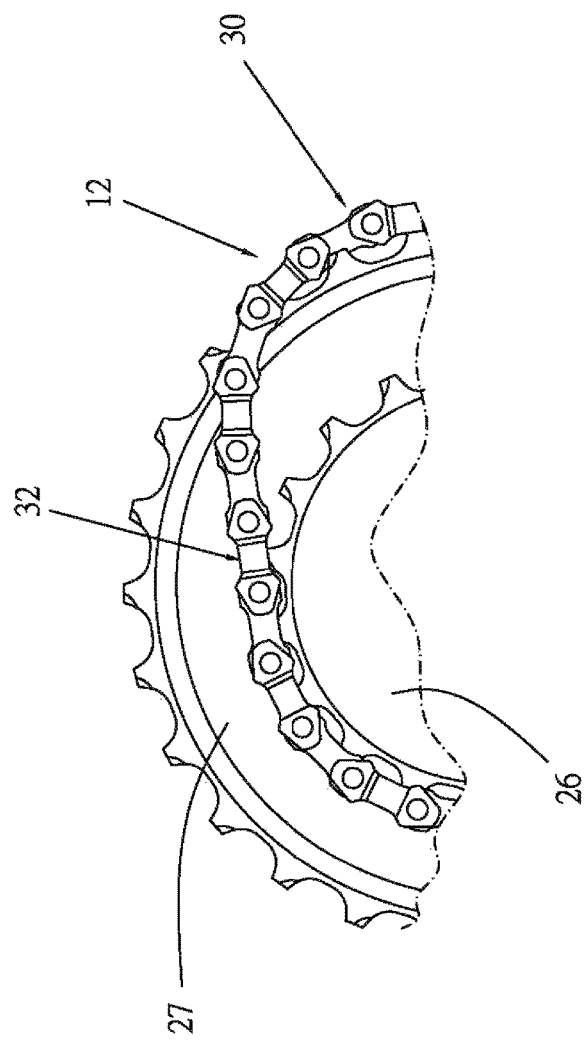
FIG. 10 is another sketch diagram of the link unit of the preferred embodiment of the present invention, showing derailing the chain.

As shown in FIGS. 5 and 8, the outer link plate 32 further includes two bent portions 78 between the outer plate end portions 34 and the outer plate connecting portion 36 respectively. The bent portions 78 make the outer plate end portions 34 and the outer plate connecting portion 36 not on the same plane.

The present invention reduces an area of the outer plate end portions 34, and a distance between the inclined sections 58, 60 and the center of the bore 38, so that the outer link plates 32 could be made of medium carbon steel with a suitable heat treatment to have a desirable strength at the inclined sections 58, 60. The design of the bent portions 78 increases a tensile strength of the outer link plates 32. As a result, the chain 12 of the present invention has an essential strength.

As shown in FIS. 9 and 10, while the chain 12 is being derailed from a small sprocket 26 onto a big sprocket 27, the chain 12 is forced toward the big sprocket 27 in a tilted condition, and the outer link plate 32 on the inner side is the first part arrived at the big sprocket 27. The link units 30 will be closer to the big sprocket 27 than the prior art, so that teeth of the big sprocket 27 and the chain units 30 which are engaged with the big sprocket 27 are kept in the same direction. As a result, the teeth of the big sprocket 27 is located at centers of the chain units 30.

Figure 11:
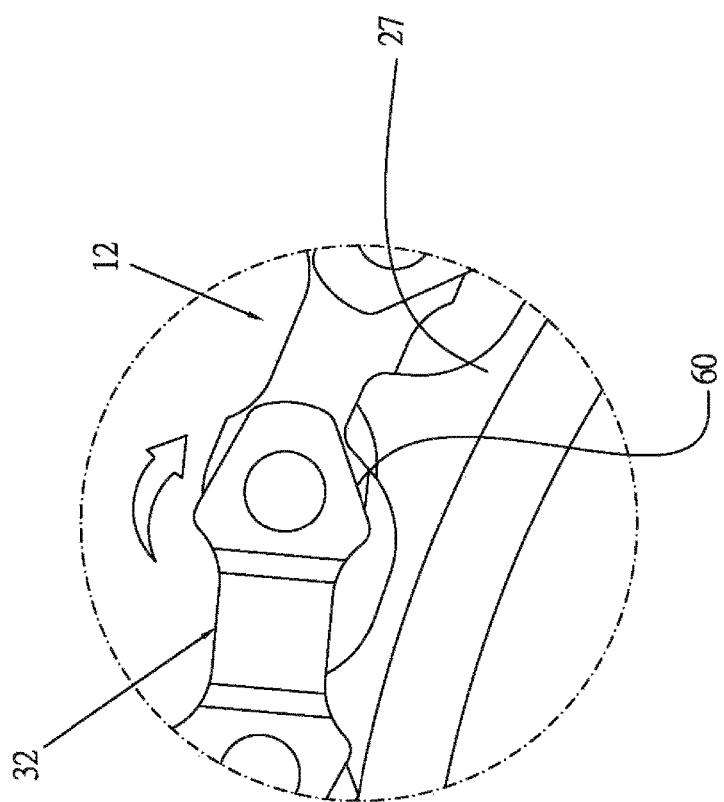
FIG. 11 is an enlarged view of the link unit of the preferred embodiment of the present invention, showing derailing the chain.

As shown in FIG. 11, since the chain 12 is tilted, the inclined sections 60 give a space to make the outer link plates 32 do not touch the big sprocket 27.

In conclusion, the chain 12 of the present invention provides a space for derailing the chain 12 from the small sprocket 26. With the tilting angle of the chain 12, the chain could be derailed with a low interference.

Although the chain 12 is tilted and tensioned when derailing, it could make the teeth of the sprocket 26 engage the link units 30 at the centers thereof. Therefore, a relative angle between the chain 12 and the sprocket 26 is reduced. It could reduce the tilting angle and the tension of the chain 12, furthermore, it could increase the mobility of the chain 12 to make it faster and smoother for derailing.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle chain, comprising a plurality of link units in series connection, wherein each of the link units comprises:
   two outer link plates, which are parallel to each other, each having two outer plate end portions and an outer plate connecting portion between the outer plate end portions, wherein each of the outer plate end portions has a bore;
   wherein each of the two outer link plates is defined with a bore line, which extends through centers of the bores, and two radial lines, which extend through the centers of the bores respectively and are perpendicular to the bore line;
   wherein each of the outer plate end portions of the two outer link plates has two cut portions on an edge thereof, and each of the cut portions has two inclined sections on opposite sides of the edge of the outer plate end portion; further wherein opposite ends of the inclined sections are located at opposite sides of the radial lines;
   wherein each of the inclined sections of the two outer link plates has a straight portion and two curved portions at opposite ends of the straight portion, and on each of the two outer link plates the radial line crosses both of the two straight portions;
   two inner link plates, which are parallel to each other, each having two inner plate end portions, and each of the inner plate end portions having a bore, wherein the inner link plates are attached to inner sides of the two outer link plates with the bores of the inner link plates aligned with the bores of the two outer link plates respectively; and a pin inserted into the bores of the two outer link plates and the inner link plates.

2. The bicycle chain of claim 1, wherein each of the outer plate end portions of the two outer link plates has a curved section with opposite ends connected to the inclined sections.

3. The bicycle chain of claim 2, wherein the curved section has a front portion and two connecting portions; each of the connecting portions has opposite ends connected to the front portion and the inclined sections respectively.

4. The bicycle chain of claim 3, wherein two first connecting points are defined between the connecting portions and the front portion respectively, and two second connecting points are defined between the connecting portions and the inclined sections respectively; a first diameter is defined between the center of the bore and the first connecting points, and a second diameter is defined between the center of the bore and the second connecting points; the first diameter is greater than the second diameter.

5. The bicycle chain of claim 1, wherein each of the two outer link plates further includes two extending curved sections on each of the edges of the outer plate end portions respectively; each of the extending curved sections has opposite ends connected to the inclined sections and the outer plate connecting portion; each of the extending curved sections has an outward portion and an inward portion; the outward portion has opposite ends connected to the inclined section and the inward portion while the inward portion is connected to the outer plate connecting portion.

6. The bicycle chain of claim 1, wherein each of the two outer link plates further includes two bent portions between the outer plate end portions and the outer plate connecting portion respectively; whereby the outer plate end portions and the outer plate connecting portion are not on the same plane.

\* \* \* \* \*